United States Patent [19]
Sheppard

[11] 3,827,456
[45] Aug. 6, 1974

[54] FLUID VALVES

[76] Inventor: William L. Sheppard, 36655 Romulus Rd., Romulus, Mich. 48174

[22] Filed: May 18, 1972

[21] Appl. No.: 254,655

Related U.S. Application Data

[63] Continuation-in-part of Ser. No. 65,773, Aug. 21, 1970, abandoned.

[52] U.S. Cl............................ 137/525, 137/525.5
[51] Int. Cl............................................ F16k 15/14
[58] Field of Search............ 137/525, 512.15, 512.4, 137/515.6, 516.15, 525.5

[56] References Cited
UNITED STATES PATENTS

| | | | |
|---|---|---|---|
| 3,073,339 | 1/1963 | Stelzer............................ | 137/516.15 |
| 3,194,262 | 7/1965 | Hamilton et al................ | 137/525 X |
| 3,580,273 | 5/1971 | Schwarz............................ | 137/525 |
| 3,646,956 | 3/1972 | Rodgers............................ | 137/525 |

*Primary Examiner*—William R. Cline
*Attorney, Agent, or Firm*—Harness, Dickey & Pierce

[57] ABSTRACT

There is disclosed a family of check and/or pressure relief fluid valve utilizing a spring biased annular diaphragm element for valving. In a single-function form there is disclosed a simple check valve. In a dual-function form there is disclosed a check valve also having a pressure relief function permitting reverse flow above a predetermined pressure differential, this form being disclosed in an automotive fuel tank filler tube cap (i.e. a "gas cap"). There is also disclosed an improved filler tube cap construction and seal therefor. In a multifunction form there is disclosed a fluid valve capable of relieving a source of fluid under pressure to a primary outlet at a first very low pressure and additionally to a secondary outlet at a higher pressure. This valve also acts as a check valve by preventing the pressure of the fluid source from dropping below that at the secondary outlet. There is also disclosed an arrangement for using this multifunction valve in an evaporative emission control system for a motor vehicle having an internal combustion engine. All of the valves disclosed are particularly suited for gaseous fluids.

15 Claims, 14 Drawing Figures

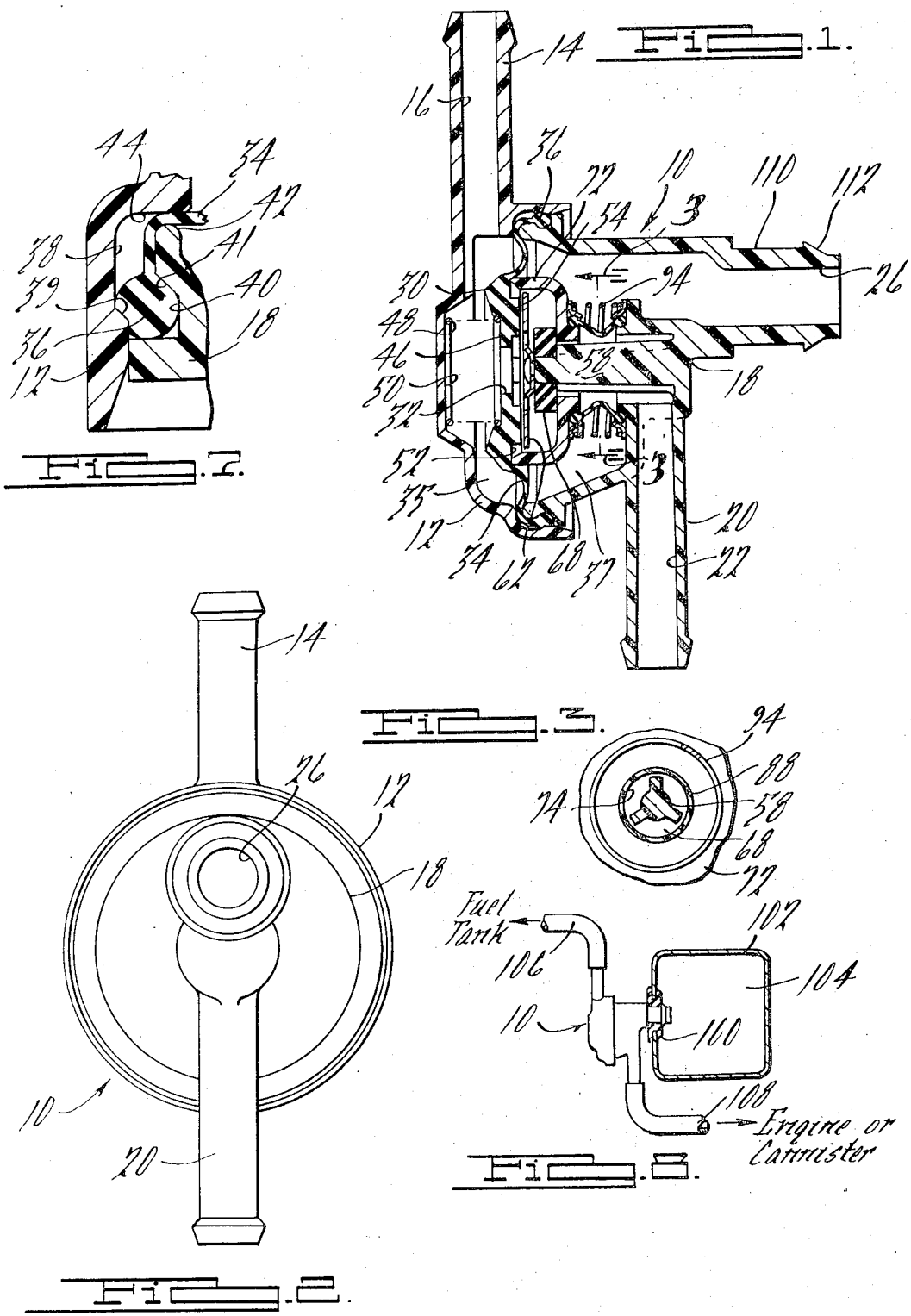

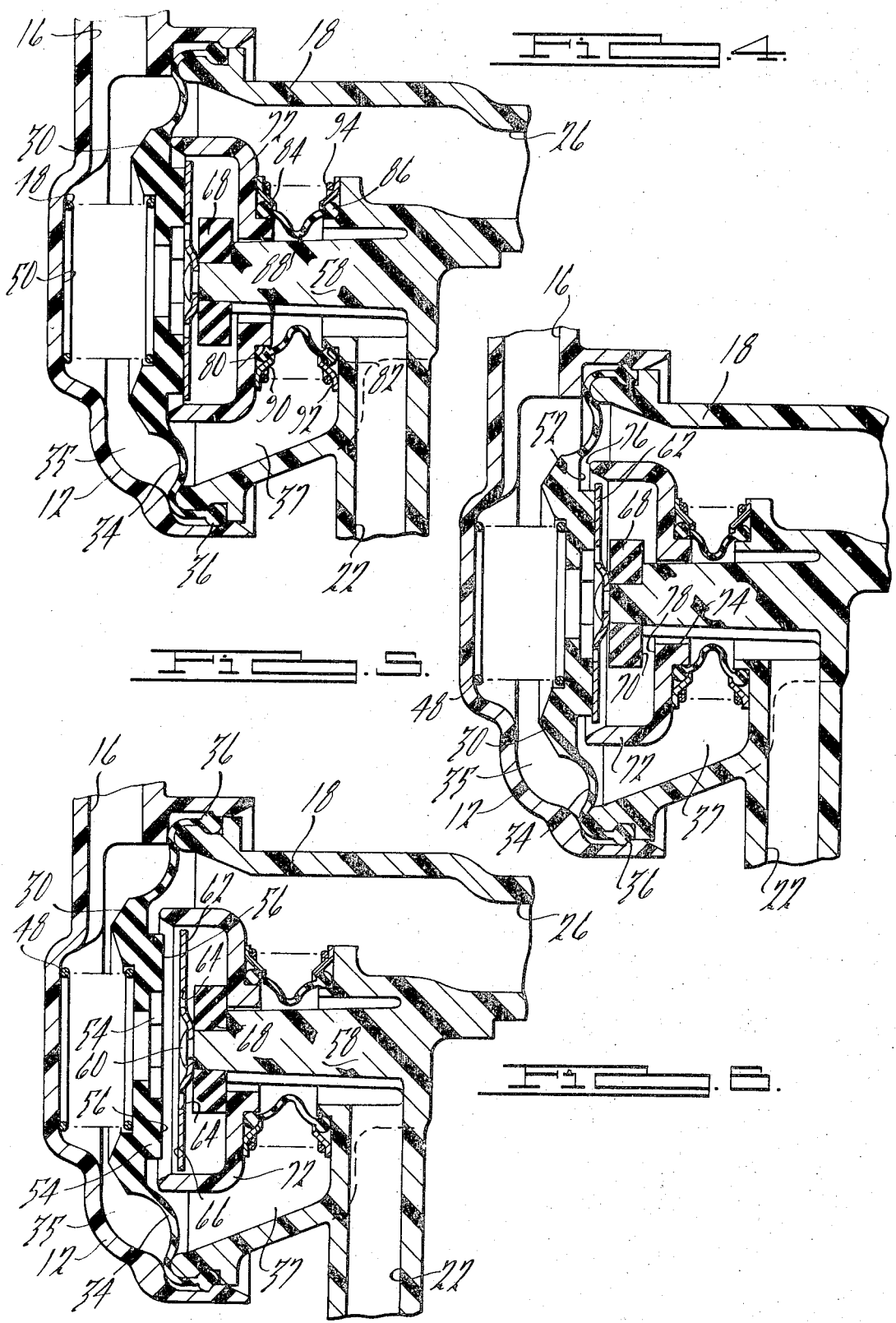

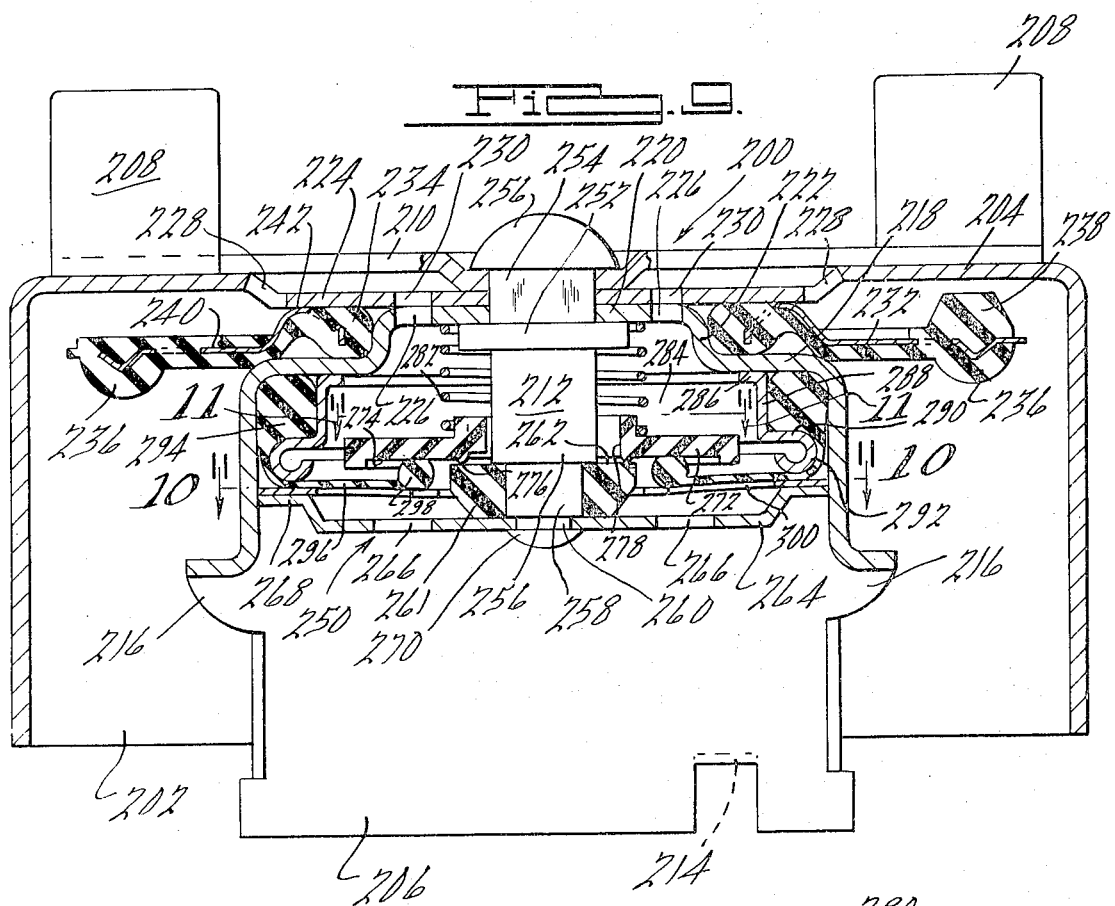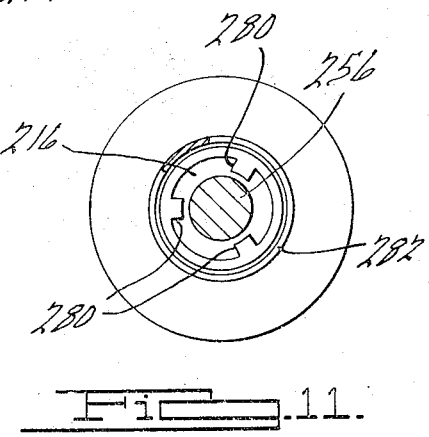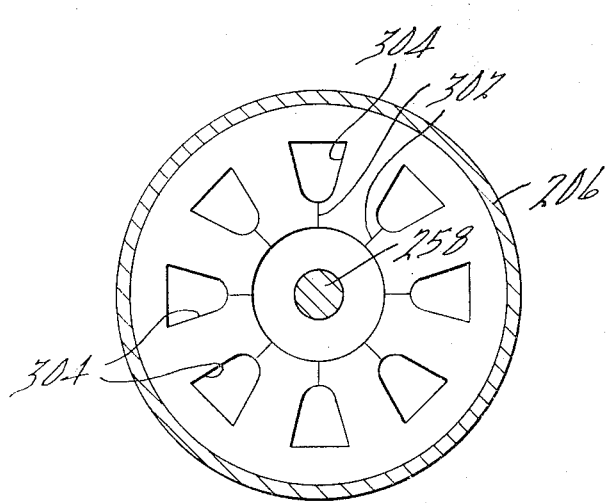

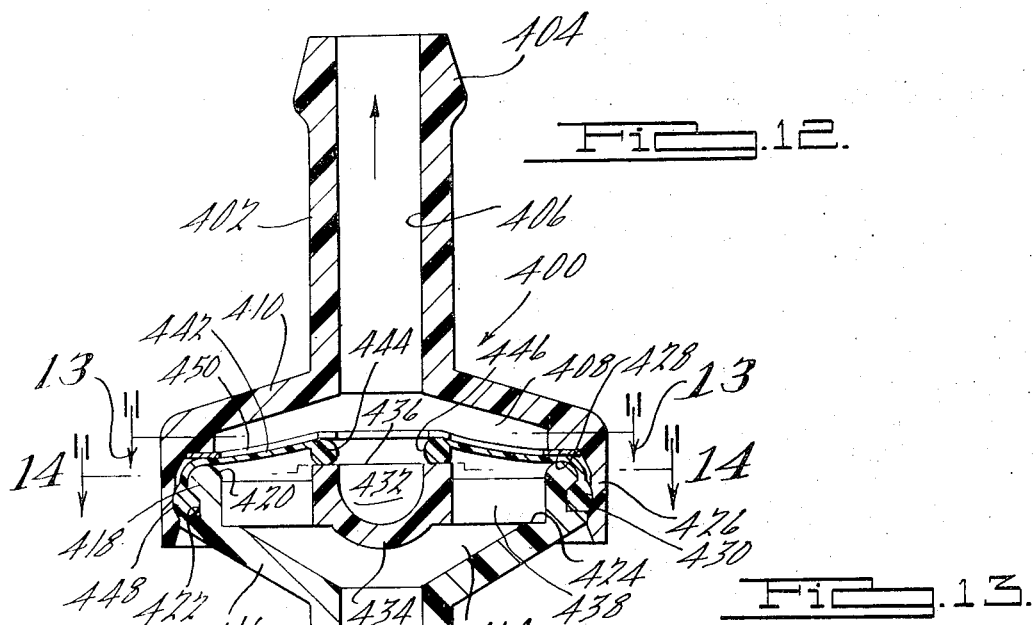
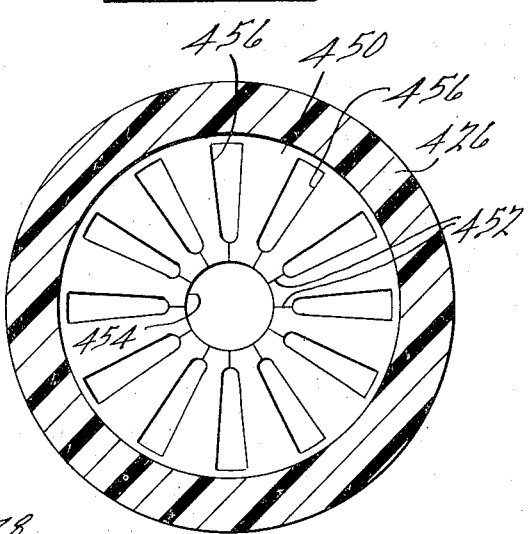
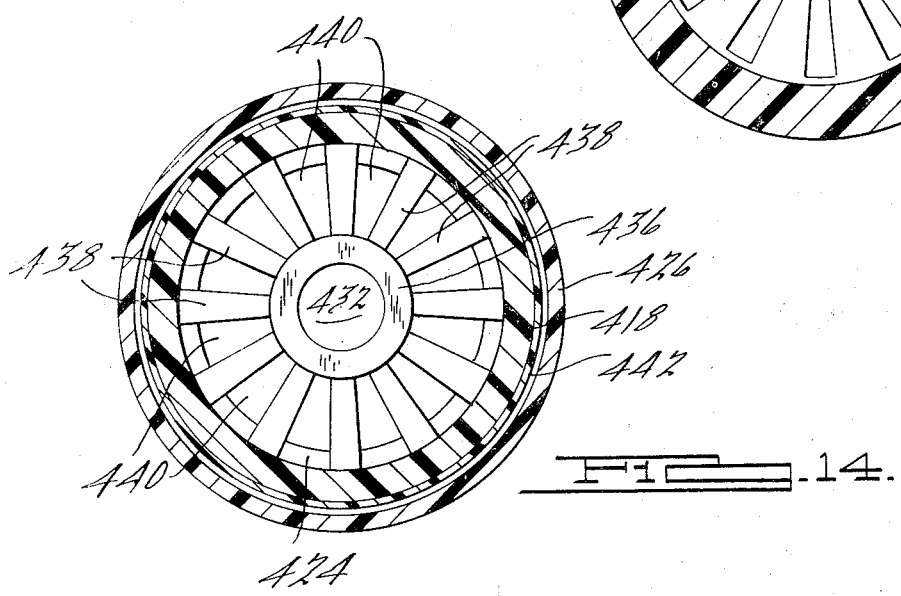

FLUID VALVES

REFERENCE TO COPENDING APPLICATION

This application is a continuation-in-part of applicant's co-pending application Ser. No. 65,773, filed Aug. 21, 1970 entitled Fluid Valve, now abandoned.

BACKGROUND AND SUMMARY OF THE INVENTION

All forms of the valve of the present invention embody an extremely sensitive and reliable check valve utilizing an annular diaphragm element having a relatively large effective area exposed to the pressure of the fluid for controlling a valve having a relatively small sealing area. Thus, miniscule pressure differentials will give relatively high sealing forces. The possible uses for the single-function check valve are virtually unlimited, however it has been found to be ideal in vacuum control systems for automotive heating and air conditioning systems. The multifunction form of the valve of this invention is particularly suited for use in an evaporative emission control system for a motor vehicle having an internal combustion engine. The primary function of evaporative emission control systems is to eliminate or reduce the quantity of undesirable hydrocarbon fuel vapors which evaporate to the atmosphere from the fuel system, usually through the vents which are normally provided. In such an application the valve inlet is connected to the fuel tank, the primary outlet to the engine, either directly or through a cannister of activated charcoal in accordance with known practice, and the secondary outlet to the atmosphere or a secondary receptacle, either directly or through an adsorbing medium in accordance with the present invention. When vapor pressures start to build up in the fuel tank the primary pressure relief section of the present valve, which is responsive to extremely small pressure differentials (i.e., less than 0.2 psig), opens to permit such vapors to accumulate in the engine (crankcase and/or air cleaner) or a charcoal loaded cannister via the primary outlet. This prevents the vapors from going into the atmosphere. In most systems vapors which accumulate when the engine is not running are purged by intake manifold vacuum when the engine is started, so that capacity is recreated for accumulating vapors when the engine is again stopped. In practice it has been found that under certain conditions (extreme heat, etc.) the quantity of vapor evaporating in the fuel tank is so great that the primary system cannot handle them, and as a consequence pressure builds up in the fuel tank. This is undesirable because it may rupture the tank or if repeated may cause seams to crack and leak. The secondary pressure relief section of the present valve prevents this by opening when the pressure differential reaches a potentially injurious level to permit such excessive vapors to escape from the tank via the secondary outlet, in addition to the primary outlet. In known systems the secondary outlet communicates directly with the atmosphere, however one aspect of the present invention resides in communicating such excessive vapors to an auxiliary receptacle such as the interior of a box section of the vehicle frame, either directly or via an adsorbing medium disposed either inside or outside the hollow frame section. Should the pressure in the tank ever drop below atmospheric (such as might be due to rapid cooling, action of the fuel pump, etc.) collapsing of the tank and/or flexing cracks are prevented by the check valve function of the present valve which causes it to open in response to an extremely small negative pressure condition (e.g. 1 inch water column) in the tank to place the latter in communication with the atmosphere via the secondary outlet.

The dual-function form of the present valve is also particularly suited for an evaporative emission control system, but one which is less sophisticated than the one described above. In this simpler system, venting of the fuel tank to atmosphere takes place through the cap for the tank filler tube. The valve is disposed in the cap and has a pressure relief function which operates to prevent venting unless the vapor pressure in the tank exceeds atmospheric by some predetermined value (high enough to eliminate most unnecessary venting, but low enough to prevent pressure damage to the tank or fuel system). It also has a check valve function which is responsive to the existence of even an extremely small negative pressure in the tank to place it in communication with the atmosphere, as does the multifunction valve. Another aspect of this invention concerns the provision of an improved "gas cap" construction having improved sealing means.

Primary objects of the present invention reside in the provision of a family of relatively simple and inexpensive valves having the aforesaid characteristics and functions, which valves are responsive to extremely small positive or negative pressure differentials and yet remain fully and reliably closed until conditions call for opening.

Another important object of the present invention concerns the provision of a family of very sensitive diaphragm-type valves which will close without pressure reversal and which incorporate means preventing overstressing or extrusion of the diaphragm itself.

Another important object of the present invention resides in the provision of a very sensitive check valve which will open in response to extremely small pressure differentials, in the order of several inches of water, and yet which will not leak when subjected to relatively large pressure reversals, in the order of one atmosphere or more.

Another important object of the present invention resides in the provision of a multifunction valve in which the primary and secondary pressure relief functions are accomplished by essentially two relief valves in series, whereby the secondary valve remains fully closed until the primary valve is fully open, and one which is not responsive to pressures downstream of the primary outlet.

Another important object of the present invention resides in the provision of an evaporative emission control system in which secondary vapors are not communicated directly to the atmosphere.

Another important object of the present invention resides in the provision of an extremely simple and inexpensive technique for mounting to a motor vehicle such a valve for an evaporative emission control system.

Another important object of the present invention resides in the provision of extremely simple and highly efficient sealing means for valves.

Another important object of the present invention resides in the provision of a very sensitive dual function valve of the type described which will fit within a conventional fuel tank filler tube cap.

Another important object of the present invention resides in the provision of a fuel tank filler tube cap having improved sealing means.

Other objects, features and advantages of the present invention will become apparent from the subsequent description and the appended claims, taken in conjunction with the accompanying drawings.

BRIEF DESCRIPTION OF THE DRAWINGS

FIG. 1 is a longitudinal sectional view of a multifunction valve embodying the principles of the present invention;

FIG. 2 is an end view thereof;

FIG. 3 is a sectional view taken along the line 3—3 in FIG. 1;

FIGS. 4, 5 and 6 are enlarged fragmentary views illustrating the valve under different operating conditions;

FIG. 7 is an enlarged fragmentary sectional view of a portion of the valve;

FIG. 8 is a diagrammatical illustration of a manner in which the valve can be incorporated into an evaporative emission control system;

FIG. 9 is a longitudinal sectional view of a dual-function valve embodying the principles of the present invention and incorporated in a fuel tank filler tube cap;

FIG. 10 is a sectional view taken along line 10—10 in FIG. 9;

FIG. 11 is a sectional view taken along line 11—11 in FIG. 9;

FIG. 12 is a longitudinal sectional view of a simple check valve embodying the principles of the present invention;

FIG. 13 is a sectional view taken along line 13—13 in FIG. 12; and

FIG. 14 is a sectional view taken along line 14—14 in FIG. 12.

DETAILED DESCRIPTION OF THE PREFERRED EMBODIMENTS

Although the multifunction valve of the present invention is believed to have general utility, it is known to be particularly suited for use in motor vehicle evaporative emission control systems and therefore will be described herein in such a system.

The multifunction valve, indicated generally at 10, comprises a first housing element 12 having an inlet tubing or hose nipple 14 containing an inlet passageway 16, and a second housing element 18 having a primary outlet hose nipple 20 containing primary outlet passageway 22 and a secondary outlet passageway 26. Housing elements 12 and 18 are generally hollow, defining a cavity in which is disposed a resilient or flexible diaphragm of circular configuration in plan having a relatively stiff central section 30 containing a center passageway 32, an annular flexible section 34 extending outwardly from central section 30 and a peripheral sealing bead section 36. The diaphragm divides the housing cavity into separate cavities 35 and 37, inlet passageway 16 communicating directly with cavity 35.

Housing elements 12 and 18 are provided with complementary opposed annular recesses 38 and 40 respectively (FIG. 7) which receive in a sealing manner bead portion 36 when the two housing elements are assembled to one another. The housing elements are dimensioned so that element 18 may be easily inserted within element 12 without interference, recesses 38 and 40 being provided with annular shoulders 39 and 41 respectively so that when the elements are assembled with bead 36 in place they snap over the resilient bead and are held assembled by the engagement of the bead with shoulders 39 and 41. Bead 36 not only holds the parts together but it seals cavities 35 and 37 from one another and from the atmosphere at the juncture of the housing elements. Element 18 is provided with a rounded annular ridge 42 which urges section 34 of the diaphragm against a complementary flat surface 44 on element 12, whereby the diaphragm is secured against movement along a circular line which lies in a single plane and is concentric with the center of the diaphragm. All sections of the diaphragm are generally symmetrical about and concentric with such axis, which as used herein constitutes the center axis or axis of movement of the valve means.

Central section 30 of the diaphragm has formed on one side thereof a flat transverse annular surface 46 adapted to engage a compression spring 48 which operates between it and a complementary parallel surface 50 on housing element 12, and on the other side thereof a flat transverse annular valve surface 52 and a plurality of lugs 54 having flat stop surfaces 56 lying in a common transverse plane (FIG. 6).

Formed integrally with housing element 18 along said center axis is a fluted projection 58 having rigidly secured to the free end thereof by a suitable fastening device 60 (FIG. 6) a circular stop member 62 having a plurality of holes 64 therein and a flat transversely extending surface 66 extending parallel to and in alignment with stop surfaces 56 on the diaphragm. Spring 48 urges the diaphragm toward the right as shown. Projection 58 also has fixedly secured thereto adjacent the stop member a resilient valve member 68 having a valve surface 70 lying in a flat transverse plane (FIG. 5). Stop member 62 is constructed so that the flow of fluid through holes 64 is not blocked by valve member 68 or lugs 54 on the diaphragm when it engages the stop member.

Also disposed in cavity 37 is a cup-shaped element 72 having a center bore 74 (FIG. 5) loosely surrounding and guided by projection 58. As best seen in FIG. 5, the outer rim of element 72 is provided with a rounded annular valve surface 76 adapted to sealingly engage valve surface 52 on the diaphragm (together they constitute the secondary valve), and the center portion of cup element 72 is provided with an annular valve surface 78 adapted to sealingly engage valve surface 70 on valve member 68 (together they constitute the primary valve).

As best seen in FIG. 4, cup element 72 and housing element 18 are provided with complementary opposed projecting cylindrical shoulders 80 and 82, respectively, against the corners defined by which are sealingly engaged the circular end beads 84 and 86 of a flexible bellows 88. Bead 84 is urged in place by a conical washer 90 and bead 86 by a conical washer 92. A compression spring 94 urges washer 90 toward cup element 72 and washer 92 toward housing element 18 to cause the olique surfaces on the washers to urge the beads into a sealing engagement, primarily with the cylindrical portions of the shoulders because their shape is more easily controlled. Assembly of the bellows is easily affected by merely collapsing the spring-andwasher-bellows assembly with a suitable tool, placing one end over shoulder 82, inserting shoulder 80 of the cup element into the other end, mounting valve element 68 in place, and then releasing the spring to permit it to expand to urge each bead into sealing engagement with its corresponding shoulder.

Spring 94 also biases cup element 72 toward valve element 68 and the diaphragm. Thus, in the normal or at rest condition of the valve, spring 94 urges valve surface 78 into sealing engagement with valve surface 70 and spring 48 urges valve surface 52 into sealing engagement with valve surface 76. In that condition of the valve stop surfaces 56 are spaced from stop member 62, as is shown in FIG. 1.

The flow of inlet fluid through the valve to the primary outlet is from inlet passageway 16 through center passageway 32, holes 64, across the primary valve defined by valve surfaces 70 and 78, between the flutes of projection 58 and bore 74 into the chamber defined by bellows 88, which is in direct fluid communication with outlet passageway 22. Secondary inlet fluid flows from inlet passageway 16 through central passageway 32 and the secondary valve defined by surfaces 76 and 52 directly into secondary outlet passageway 26. Although the inlet fluid is predominantly gaseous, a liquid-air froth or even small amounts of liquid fuel may pass through the valve.

The inlet pressure which acts to open the primary valve is that which acts on the effective area of the diaphragm less the closed effective area of the primary valve (i.e., that defined by the outside diameter of valve element 68). Spring 94 is chosen to give the desired opening pressure relief setting for the primary valve for the size valve used, subject to corrections for the forces applied by spring 48, the diaphragm itself, and the bellows itself. The pressure which acts to open the secondary valve is that which acts on the effective area within valve surface 76, less the open effective area of the primary valve (which is greater than defined by the diameter of bore 74 but less than the closed effective area, depending on how far open the valve is). The desired opening pressure relief setting for the secondary valve is thus achieved by choosing the desired diameters and hence areas. Spring 48 is preferably just sufficiently strong to hold valve surface 52 on the diaphragm sealingly against valve surface 76 in the presence of atmospheric pressure in the inlet passageway.

The present valve is ideally suited to high volume production techniques because of the relative simplicity of its design and method of assembly. For example, the housing elements may be molded from nylon, the cup-shaped element from Delrin, and the diaphragm bellows and valve member from a suitable elastomer such as an epichlorohydrin rubber. Washers 90 and 92 and stop member 62 may be stamped sheet metal. Fastening device 60 may consist merely of a spun or mashed tit integrally formed on the end of projection 58.

In FIG. 8 there is diagrammatically illustrated a novel technique for using the multifunction valve in an evaporative emission control system for a motor vehicle. The inlet nipple is connected to a hose 106 which connects to the top of the fuel tank (not shown), and the primary outlet nipple is connected to a hose 108 which connects to either the motor vehicle engine, cannister of activated charcoal or other primary accumulator in accordance with the practices of known systems. In prior systems the secondary outlet of the control valve normally vented to atmosphere. This of course meant that in the event an excessive vapor or pressure condition occurred, causing the secondary outlet to function, fuel vapors and sometimes liquid fuel would be dumped directly into the atmosphere or onto the street, as the case may be. In accordance with one aspect of the present invention, however, housing element 18 is provided with a projecting portion having an annular groove 110 adapted to be inserted into a conventional rubber grommet 100 in a suitably located opening in the box section 102 of the usual frame of a motor vehicle. This arrangement not only provides an extremely simple and inexpensive way of mounting the present valve in such a system, but also results in there being provided an auxiliary recepticle (i.e., the hollow interior 104 of the box section) in which the excess vapors and possibly small portions of liquid fuel can accumulate. Housing element 18 is provided with a conical surface 112 adjacent groove 110 to facilitate insertion of the valve into the grommet. Additionally, the normally empty space 104 within the box frame may be filled (between suitable barriers if desired) with activated charcoal, whereby additional means are provided for accumulating and/or adsorbing excess fuel vapors or the like. It is contemplated that the frame section would not be sealed from the atmosphere (conventional construction), so that the secondary outlet will always be at atmospheric pressure.

The operation of the present valve will be described in connection with its use in an evaporative emission control system although the characteristics of its operation are applicable to other environments. In its normal at rest condition (atmospheric pressure at the inlet and both outlets) the valve is as shown in FIG. 1 with both the primary and secondary valves closed. When pressure starts to build in the fuel tank it will bias the diaphragm to the right as shown in FIG. 1, which in turn will cause cup-shaped element 72 to move to the right thereby opening the primary valve to permit the fuel vapors, etc., to flow from inlet passageway 16 into primary outlet passageway 22 and thence to the engine or a cannister, depending on the particular system in which the valve is utilized. Because of the relatively large effective area offered by the diaphragm spring 94 and the diameter of the primary valve may be chosen to render the valve responsive to an extremely small increase in pressure above atmospheric. For example, pressure settings of as low as 0.114 psig have been achieved. The movement of the diaphragm to the right is progressive with increasing pressure, as is the opening of the primary valve, until surfaces 56 on lugs 54 engage stop surface 66 on stop member 62, in which condition the primary valve is fully open. This condition of the valve is shown in FIG. 4. Should the pressure in the fuel tank build up to a value which exceeds the setting of the primary valve cup-shaped element 72 (but not the diaphragm which is now against the stop) will be biased to the right by such excess pressure thereby opening the secondary valve. In condition, shown in FIG. 5, all inlet fluid which cannot flow through the primary valve will flow through the secondary valve to the secondary outlet. Thus, it can be seen that the primary and secondary valves operate in a series with one another in that the secondary valve cannot begin to open until the primary valve is fully open.

This means that the secondary pressure relief setting will always be higher than that of the primary.

In the event a vacuum condition develops in the fuel tank, such as by rapid cooling or action of the fuel pump, such decreased pressure will cause the diaphragm to move to the left as shown in FIG. 6 to permit atmospheric air to flow through the secondary outlet and the secondary valve into the fuel tank. This eliminates the need for the normal gas cap vent. Response to vacuums as small as 1 inch of water column have been achieved with the present valve.

A further advantage of the present valve is that the mean effective area of bellows 88 may be made essentially the same as the mean effective area of the primary valve so that the presence of a vacuum or a pressure communicated to primary outlet passageway 22 will not itself influence the valve in any way. In addition, the primary valve is designed with built-in hysteresis, giving it stability. This arises from the fact that the effective area of the primary valve decreases when it opens, thus causing it to close at a lower inlet pressure than that at which it opens, which in turn prevents hunting, noise and the like.

With reference to the dual-function embodiment of FIGS. 9–11, there is illustrated a fuel tank filler tube cap 200 incorporating a combined tank vent and pressure relief valve embodying the principals of the present invention. The gas cap construction comprises a generally cylindrical outer shroud or shell 202 having closed end wall 204, a generally cylindrical concentrically located internal cup element 206, and handle means including manually operable handle tabs 208 projecting away from end wall 204 and having an integral retaining portion 210 overlying such wall portion. The overall assembly may be fastened together by means of a rivet-like fastener 212 in a manner to be described. Cup element 206 is designed to fit within the conventional filler tube (not shown) of an automotive vehicle fuel tank and is provided with conventional latching tangs 214 and 216, for locking the cap in the safety blow-off and the fully locked or sealed position, in accordance with known practices. The overall cylindrical shape of cup element 206 assists in the centering of the valve cap on the filler tube, and shell 202 overlies the outside of the free end of the filler tube to cover and protect same. The shell and cup element may be inexpensive metal stampings.

The upper end of cup element is generally closed by an outer annular end wall portion 218, a central end wall portion 220 and an interconnecting portion 222. End wall portion 220 is provided with a plurality of through holes 226. In addition, the central portion of end wall 204 of the shell is depressed slightly as indicated at 224 and provided with a plurality of outer through holes 228 placing the inside of the shell in communication with the atmosphere, and a plurality of inner through holes 230 aligned with holes 226 to place the interior of cup element 206 in communication with the atmosphere. Depressed portion 224 is greater in area than handle portion 210 so that the latter does not block communication with holes 228 and 230.

In order to provide a seal between the top of the filler tube (not shown) and the cap, there is provided a resilient, annular, generally flat sealing element 232 having an enlarged bead portion 234 disposed about its inner periphery and a downwardly projecting annular bead portion 236 about its outer periphery. Bead portion 234 is generally circular in cross-sectional configuration when in the relaxed state, and is disposed between end wall portions 218 and 224 in a sealing relationship with respect thereto. The lower portion of the cross-sectional configuration of bead 236 is rounded in order to provide a sealing surface adapted to sealingly engage the upper end of the fuel tank filler tube. The upper surface of sealing element 232 may be provided with a plurality of integral projections, one of which is indicated at 238, adapted to engage end wall 204 and thereby prevent overstressing of sealing element 232 if the cap is overtightened. Embedded within element 232 is a generally annular reinforcing and spring element 240. Sealing element 232 is preferably formed from an elastomeric material such as Buna-N and has molded therein reinforcing element 240, which may be of a suitable spring material such as silicone bronze. Reinforcing element 240 is of the cross-sectional configuration illustrated in FIG. 9, and as can be seen at 242 is provided with an upwardly projecting annular ridge which directly engages end wall 224. Reinforcing element 240 thus maintains the sealing element in its at rest position illustrated, acts as a biasing element to urge it sealingly against the end of the filler tube, and prevents it from wrinkling.

It has been noted above that projections 238 prevent overstressing of sealing element 232 and reinforcing element 240 in the axial direction. Overstressing in the circumferential direction is also prevented to some extent by reinforcing element 240, but the general arrangement of the parts gives further protection, i.e., when the cap is torqued down on the end of the filler tube to the point when the friction of bead 236 therewith reaches a potentially damaging magnitude, inner bead 234 (because of its smaller radius and hence smaller moment arm) will slide or rotate with respect to the remainder of the cap structure to prevent circumferential overstressing. This protection may be accomplished by properly sizing bead 234 with respect to end wall portions 218 and 224, and portion 222 in accordance with known practices.

The basic valve cap as described up to this point is capable of fully sealing the open end of a conventional fuel tank filler tube, utilizing improved sealing means. The only communication between the interior of the filler tube and the atmosphere, when the cap is installed, is through holes 226 and 230 thereof. The flow of fluid (e.g., fuel vapor and/or atmospheric air) through the holes is controlled by a valve indicated generally at 250 disposed within cup element 206 and supported by fastener 212. As best seen in FIG. 9, the main shank portion of fastener 212 is provided with an annular flange 252. The portion of the shank of fastener 212 disposed outwardly from flange 252, indicated at 254, may be square in cross-section and presses through correspondingly shaped holes in the end walls of cup element 206 and shell 202. These parts are rigidly connected together by deforming the end of portion 254 into an enlarged head 256, in the same manner as a rivet. The square shape of portion 254 and the openings through which it bases prevent relative rotation of the parts. The inner portion of the shank of fastener 212, indicated at 256, may be circular in cross-sectional configuration and is provided with a first reduced diameter portion 258 and a second reduced diameter portion 260, progressively.

Disposed about portion 258 is a valve seat 261 having a generally flat annular valve surface 262. Valve seat 261, which may be formed of a suitable elastomeric material, such as Buna-N, is held in place by means of a retainer 264 having a plurality of through holes 266 and extending outwardly for the entire extent of the interior of cup element 206, the outer periphery of retainer 264 having an offset flange 268 disposed adjacent the inner wall of the cup element. Retainer 264, which may be an inexpensive metal stamping, is in turn held in place by forming the end of fastener portion 260 into an enlarged head 270, in the same manner as a rivet.

Also disposed about portion 256 of fastener 212 is an annular valve element 272 having a generally flat annular first valve surface 274 and a second relatively narrow annular valve surface 276 disposed concentrically inwardly with respect thereto and adapted to sealingly engage valve surface 262 on valve seat 261. Valve element 272, which may be molded out of inexpensive plastic, such as polycarbonate, is provided with an enlarged central passageway 278 which is larger than the portion 256 of fastener 212 and is provided with a plurality of projections 280 to keep the valve element loosely centered on fastener 212. Valve element 272 is resiliently biased against valve seat 261 by means of a compression spring 282. Also disposed within cup element 206 is an annular retaining element 284 including an inwardly directed radial flange 286 engaging end wall portion 218, a cylindrical wall portion 288 and a radially outwardly directed flange 290 having a reversely curled edge 292 presenting a smooth arcuate outer surface. Retaining element 284 may be an inexpensive metal stamping. Sealingly disposed between the outer corner of end wall portion 218 of cup element 206 and portions 288 and 290 of retaining element 284 is an enlarged outer peripheral bead 294 of an annular diaphragm 296 having enlarged inner peripheral bead 298 adapted to sealingly engage valve surface 274 on valve element 272. Beads 294 and 298 are generally circular in cross-section in the relaxed state. Diaphragm 296 is formed from a suitable elastomer, such as epichlorohydrin or the like. Disposed between diaphragm 296 and flange 268 of retainer 264 is the outer periphery of an annular washer-type spring 300 having a plurality of radially extending slits 302 and openings 304 to increase the flexibility thereof, the inner periphery of which is resiliently biased against the inner periphery of diaphragm 296 to bias bead 298 into sealing engagement with valve surface 274. Spring 300 may be formed of silicon bronze or like spring material, and preferably exerts just sufficient force on the diaphragm to seat same.

The dual function valve of this embodiment functions in the following manner when affixed to the open end of a filler tube by means of a cap of the construction illustrated. Since bead 298 normally engages valve surface 274, since valve surface 276 normally engages valve seat 261 and since the end of the filler cap is sealed by means of sealing element 232, the escape of vapors is normally prevented from the fuel tank, as is the flow of atmospheric air into the tank. However, upon the creation of even a slight negative pressure in the tank with respect to atmosphere and pressure differential will act across the relatively large area of diaphragm 296 and causes it to move away from valve element 272 against the very small bias of spring 300 to permit atmospheric air to flow into the tank through holes 230 and 226, across the gap between bead 298 and valve surface 274, through the center valve opening in spring 300 and thence through holes 266 into the tank. Diaphragm 296 thus provides the check valve function of this valve. Pressure differentials in the opposite direction merely cause the diaphragm to seal more tightly. When the pressure in the tank reaches a predetermined differential with respect to atmospheric pressure, however, valve element 272 and diaphragm 296 move upwardly together in response thereto against the bias of spring 282, but assisted by the small bias of spring 300, to cause valve surface 276 to move away from valve surface 262 of valve seat 261, thereby permitting the exit of vapor or the like from the fuel tank through holes 266, the gap between valve seat 261 and valve element 272, passageway 278, and holes 226 and 230 to atmosphere. The predetermined pressure differential at which the valve will permit venting is determined by the rate of spring 282 and the effective diameters of the valve seals and the elements responsive to actuating pressure, in accordance with established procedures.

With reference to the embodiment of FIGS. 12-14, there is illustrated a check valve 400 comprising two joined housing sections 402 and 404, respectively, preferably inexpensively molded from plastic. Each of these sections is provided at its free end with an enlarged portion 404 constituting a conventional nipple for receiving a hose or the like. Section 402 is provided with a through passageway 406 communicating with a chamber 408 within an enlarged portion 410, and section 403 with a through passageway 412 communicating with a chamber 414 defined by an enlarged portion 416 which terminates in an annular portion 418 having a rounded upper surface 420, a circumferential notch 422 around the outer periphery and a square-cornered recess 424 about the inner periphery. Portion 410 of section 402 terminates in a cylindrical flange portion 426 about the inner periphery of which is provided a flat annular shoulder 428 and a circumferential groove 430.

Disposed within recess 424 is a transversely arranged valve seat element 432 comprising a centrally disposed imperforate portion 434 having on the upper surface thereof (as shown in FIG. 12) a generally flat annular valve seat 436. Element 424 is maintained in position by means of a plurality of outwardly radially extending spokes 438 the end of which are disposed in recess 424 and secured to portion 418 by means of an adhesive, a press fit or the like. The spaces between spokes 438 are indicated at 440 and constitute passageways through which fluid may flow through the valve. Element 432 may also be inexpensively molded out of plastic.

Disposed above element 432 is an annular imperforate flexible diaphragm 442 having enlarged bead 444 about the inner periphery thereof defining an opening 446, and an enlarged bead 448 about the outer periphery thereof. Beads 444 and 448 are preferably generally circular in cross-sectional configuration when in the relaxed state. Diaphragm 442 is formed of a suitable elastomer, such as epichlorohydrin or the like.

Disposed above diaphragm 442 (as shown in FIG. 12) is a generally annular substantially flat (when relaxed) washer-type spring 450 which may be formed of phosphor-bronze or like spring material. Spring 450 is provided with a plurality of radially outwardly directed slits 452 extending from the inner periphery thereof, indicated at 454. Slits 452 may be provided with an enlarged cut-out portions 456, as best shown in FIG. 13, to increase the flexibilty thereof. Portions 456 are preferably spaced from inner periphery 454 in order to provide a substantially continuous annular surface on the spring adapted to bear on bead 444 of diaphragm 442.

The manner in which the valve is assembled is best illustrated in FIG. 12. As can be seen, section 403 fits within section 402 so that recess 430 lies in a generally facing opposed relationship to recess 422, and in the space defined thereby is disposed bead 448 of diaphragm 442. Bead 448 thus serves not only to anchor the outer periphery of the diaphragm but also to seal the former between sections 402 and 403 with respect to the atmosphere and both sides of the diaphragm and further to hold the two housing sections together, in essentially the same manner as is shown and described with respect to FIG. 7. The outer portion of spring 450 is pinched between the portion of the diaphragm lying on rounded surface 420 and annular surface 428 and is so arranged that the inner periphery thereof biases bead 444 against valve seat 436.

As can thus be seen, valve 400 is normally closed by virtue of the biasing action of spring 450, preferably as weak as possible, however when the pressure in passageway 412 exceeds that of passageway 406 by an amount sufficient to overcome the relatively weak bias of spring 450, the diaphragm and its bead 444 will be forced away from valve seat 446 to permit the flow of fluid through passageways 440, the space between bead 444 and valve surface 436, opening 446 and through the center of spring 450 to passageway 406. The existence of a pressure in passageway 406 greater than that in passageway 412 merely causes bead 444 to seat with greater force upon valve surface 436, thereby preventing flow in the downward direction as shown in FIG. 12. Passageways 440 are preferably sufficiently narrow to eliminate the possibility of the diaphragm extruding through said passageways in the presence of high back pressure differentials.

Thus, there is disclosed in the above description and in the drawings several exemplary embodiments of the invention which fully and effectively accomplish the objects thereof. However, it will be apparent that variations in the details of construction may be indulged in without departing from the sphere of the invention herein described, or the scope of the appended claims.

I claim:

1. A fluid valve comprising: housing means having a passageway therethrough; valve seat means including an annular valve seat in said passageway and means preventing fluid flow through the area defined by said seat; elastomeric diaphragm means having a central opening therethrough, said diaphragm means preventing the flow of fluid through said passageway except through said opening; and means defining a bead of increased thickness about the periphery of said opening and an attaching portion adjacent the outer periphery of said diaphragm means, the entire intermediate portion of said diaphragm means disposed between said bead and said attaching portion being relatively thin and flexible as compared to said bead, said attaching portion being fixed with respect to said housing means, the upstream portion of said bead being generally circular in cross-section in a relaxed state and adapted to normally sealingly engage said valve seat, said intermediate portion of said diaphragm means joining said bead on the opposite side of a plane disposed parallel to said valve seat and spaced therefrom in the downstream direction, said bead being movable away from said valve seat to permit the flow of fluid from one end of said passageway through said opening in a downstream direction when the pressure at said one end exceeds the pressure at said other end.

2. A fluid valve as claimed in claim 1, wherein said valve seat is fixed in location with respect to said housing means.

3. A fluid valve as claimed in claim 1, wherein said valve seat is movable with respect to said housing means.

4. A fluid valve as claimed in claim 1, further comprising spring means normally biasing said upstream portion of said bead into sealing engagement with said valve seat.

5. A fluid valve comprising: housing means having a passageway therethrough; valve seat means including an annular valve seat in said passageway and means preventing fluid flow through the area defined by said seat; elastomeric diaphragm means having a central opening therethrough, said diaphragm means preventing the flow of fluid through said passageway except through said opening; means defining a first bead of increased thickness about the periphery of said opening and a second bead of increased thickness about the outer periphery of said diaphragm means, the entire portion of said diaphragm means disposed between said two beads being relatively thin and flexible as compared to said beads, said first bead having an upstream portion which is generally circular in cross-section in a relaxed state; and spring means biasing said upstream portion of said first bead against said valve seat into sealing engagement therewith, said spring means being relatively flat when in a relaxed state and including a plurality of resilient fingers the free ends of which provide a substantially continuous annular surface bearing on said first bead, said diaphragm means and first bead being movable away from said valve seat against the bias of said spring means to permit the flow of fluid from one end of said passageway through said opening in a downstream direction when the pressure at said one end exceeds the pressure at said other end.

6. A fluid valve comprising: housing means having a passageway therethrough; valve seat means including an annular valve seat in said passageway and means preventing fluid flow through the area defined by said seat; elastomeric diaphragm means having a central opening therethrough, said diaphragm means preventing the flow of fluid through said passageway except through said opening; means defining a bead of increased thickness about the periphery of said opening, said bead having an upstream portion which is generally circular in cross-section in a relaxed state; and spring means biasing said upstream portion of said bead against said valve seat into sealing engagement therewith, said spring means being relatively flat when in a relaxed state and including a plurality of resilient fingers the free ends of which provide a substantially continuous annular surface bearing on said bead, said diaphragm means and bead being movable away from said valve seat against the bias of said spring means to permit the flow of fluid from one end of said passageway through said opening in a downstream direction when the pressure at said one end exceeds the pressure at said other end.

7. A fluid valve as claimed in claim 6, wherein said valve seat is generally flat.

8. A fluid valve as claimed in claim 6, wherein said valve seat is fixed in location with respect to said housing means.

9. A fluid valve comprising: housing means having a passageway therethrough; valve seat means including an annular valve seat disposed in said passageway and supported in position by a support element extending therefrom to said housing means, said element having a plurality of openings therethrough to permit fluid to flow therethrough, and means preventing fluid flow through the area defined by said seat; elastomeric diaphragm means having a central opening therethrough, said diaphragm means preventing the flow of fluid through said passageway except through said opening; means defining a bead of increased thickness about the periphery of said opening; and spring means biasing said bead against said valve seat into sealing engagement therewith, said spring means being relatively flat when in a relaxed state, said diaphragm means and bead being movable in a downstream direction away from said valve seat against the bias of said spring means to permit the flow of fluid from one end of said passageway through said opening in a downstream direction when the pressure at said one end exceeds the pressure at said other end, said element having downstream surface means for preventing said diaphragm means from moving excessively far in an upstream direction when the pressure at said other end exceeds the pressure at said one end.

10. A fluid valve comprising: housing means having a passageway therethrough; valve seat means including an annular valve seat in said passageway and means preventing fluid flow through the area defined by said seat; elastomeric diaphragm means having a central opening therethrough, said diaphragm means preventing the flow of fluid through said passageway except through said opening; means defining a bead of increased thickness about the periphery of said opening; and spring means biasing said bead against said valve seat into sealing engagement therewith, said spring means comprising in an unstressed state a relatively flat disc of resilient material having a central hole and a plurality of radially outwardly extending slits extending therefrom to points spaced from the outer periphery of said disc to thereby define a plurality of resilient fingers the free ends of which provide a substantially continuous annular surface bearing on said bead, said diaphragm means and bead being movable away from said valve seat against the bias of said spring means to permit the flow of fluid from one end of said passageway through said opening when the pressure at said one exceeds the pressure at said other end.

11. A fluid valve as claimed in claim 9, wherein said support element comprises a spoke-like member having spaced-apart spokes extending between said valve seat and said housing means.

12. A fluid valve as claimed in claim 10, wherein said slits are provided with cut-out portions to increase the flexibility of said fingers.

13. A fluid valve comprising: housing means having a passageway therethrough; valve seat means including an annular valve seat in said passageway and means preventing fluid flow through the area defined by said seat; resilient diaphragm means having a central opening therethrough, said diaphragm means preventing the flow of fluid through said passageway except through said opening, means defining a first bead of increased thickness about the periphery of said opening and a second bead of increased thickness about the outer periphery of said diaphragm means, the entire intermediate portion of said diaphragm means disposed between said two beads being relatively thin and flexible compared to said beads; and spring means biasing the upstream portion of said first bead against said valve seat into sealing engagement therewith, said spring means being relatively flat when in a relaxed state and being disposed transversely to the flow of fluid through the valve, said spring means having substantially the entirety of its upstream face disposed against the downstream face of said intermediate portion of said diaphragm means and including a plurality of resilient fingers the free ends of which provide a substantially continuous annular surface bearing on the downstream portion of said first bead, said diaphragm means and first bead being movable away from said valve seat against the bias of said passageway through said opening in a downstream direction when the pressure at said one end exceeds the pressure at said other end.

14. A fluid valve as claimed in claim 13, wherein said upstream portion of said first bead is rounded in cross-section so that it can roll on said valve seat and wherein clearance is provided between said valve seat and the juncture of said first bead and intermediate portion whereby increased closing pressures acting on said intermediate portion will cause said first bead to roll outwardly.

15. A fluid valve comprising: housing means having a passageway therethrough; valve seat means including an annular valve seat in said passageway and means preventing fluid flow through the area defined by said seat; elastomeric diaphragm means having a central opening therethrough, said diaphragm means preventing the flow of fluid through said passageway except through said opening; means defining a bead of increased thickness about the periphery of said opening and an attaching portion adjacent the outer periphery of said diaphragm means, the entire intermediate portion of said diaphragm means disposed between said bead and said attaching portion being relatively thin and flexible as compared to said bead, said attaching portion being fixed with respect to said housing means, said bead having a first annular surface normally sealingly engaging a second annular surface on said valve seat, one of said first or second annular surfaces being generally flat and the other being generally circular in cross-section, said bead being movable away from said valve seat to permit the flow of fluid from one end of said passageway through said opening in a downstream direction when the pressure at one end exceeds the pressure at said other end; and support means for supporting said valve seat means with respect to said housing means, said support means having a downstream face entirely spaced from the upstream face of said intermediate portion of said diaphragm means when the latter is in a relaxed state whereby a rolling action will occur between said valve seat and bead when the pressure at said other end exceeds the pressure at said one end by an amount sufficient to cause said intermediate portion to move towards said downstream face of said support means.

* * * * *

UNITED STATES PATENT OFFICE
CERTIFICATE OF CORRECTION

Patent No. 3,827,456          Dated August 6, 1974

Inventor(s) William L. Sheppard

It is certified that error appears in the above-identified patent and that said Letters Patent are hereby corrected as shown below:

Column 4, line 63, "olique" should be -- oblique --.

Column 6, line 61, after "In" insert -- this --.

Column 9, line 64, "and" should be -- such --.

Column 10, line 49, "end" should be -- ends --.

Signed and sealed this 3rd day of December 1974.

(SEAL)
Attest:

McCOY M. GIBSON JR.          C. MARSHALL DANN
Attesting Officer            Commissioner of Patents